(12) United States Patent
Burd et al.

(10) Patent No.: US 8,693,124 B1
(45) Date of Patent: Apr. 8, 2014

(54) BIT-LOCKED INTERFACE FOR MAGNETIC RECORDING

(75) Inventors: Gregory Burd, San Jose, CA (US); Qiyue Zou, San Jose, CA (US); Michael Madden, Mountain View, CA (US); Kar Shing Chiu, Palo Alto, CA (US); Vincent Wong, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 254 days.

(21) Appl. No.: 13/172,268

(22) Filed: Jun. 29, 2011

Related U.S. Application Data

(60) Provisional application No. 61/360,372, filed on Jun. 30, 2010, provisional application No. 61/409,836, filed on Nov. 3, 2010.

(51) Int. Cl.
*G11B 5/09* (2006.01)
*G11B 5/596* (2006.01)

(52) U.S. Cl.
USPC .......................... 360/51; 360/77.08

(58) Field of Classification Search
None
See application file for complete search history.

(56) References Cited

U.S. PATENT DOCUMENTS

| | | | |
|---|---|---|---|
| 2007/0139805 A1* | 6/2007 | Mead | 360/51 |
| 2010/0128384 A1* | 5/2010 | Shibano | 360/75 |
| 2010/0265614 A1* | 10/2010 | Kim et al. | 360/75 |

\* cited by examiner

*Primary Examiner* — Regina N Holder

(57) ABSTRACT

Techniques are provided for performing bit-locked operations on media. A first control signal is received from a first source, and a second control signal is generated at a second source in response to receiving the first control signal. The media is accessed according to the second control signal. One or more synchronization markers are located during the accessing of the media, and bit-level synchronization between the second source and the media is achieved based, at least partially, on the one or more synchronization markers. A control operation is performed on the media with bit-level synchrony between the second source and the media.

20 Claims, 7 Drawing Sheets

BIT-LOCKED INTERFACE FOR MAGNETIC RECORDING

CROSS REFERENCE TO RELATED APPLICATION

This application claims the benefit under 35 U.S.C. §119(e) of U.S. Provisional Application No. 61/360,372, filed Jun. 30, 2010, and U.S. Provisional Application No. 61/409,836, filed Nov. 3, 2010, each of which is incorporated herein by reference in its respective entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Operation of a read/write head may be governed by a control interface that includes a hard disk controller (HDC), for providing high level read and write commands and for controlling and adjusting positioning of the read/write head, and a read/write channel (RWC), for reading and writing data and passing information to and from the HDC. The HDC is typically aware of a format of media that is read from and/or written to, and the HDC instructs the RWC to perform various operations, including data read, data write, and servo read operations. The HDC typically initiates these operations by asserting gating signals that are received by the RWC.

The HDC and RWC may operate according to clocks having different resolutions. For example, a clock for the HDC may operate at a symbol-level resolution, while a clock for the RWC may operate at a bit-level resolution. Gating signals provided by the HDC to the RWC may therefore fail to achieve bit-level synchronization with the media since they are generated with only symbol-level resolution.

For continuous recording, an absence of bit-level synchronization between gating signals of the HDC and media creates an uncertainty in a sector starting location on the media. This may lead to lower recording densities on the media, in order to assure that sufficient gaps are present between adjacent sectors to prevent write operations from corrupting adjacent sectors on the media.

In continuous recording, locations of bit islands (or domains) on media are determined during the writing process itself. In Bit Pattern Recording (BPR), bit islands are printed (or etched) onto media during manufacturing. Therefore, bit-level synchronization of a write head with media is necessary in BPR. If a clock governing operation of the write head is not synchronized with the printed bits, then information may not be written correctly to the media.

One method to achieve bit-level synchronization between a write head and media is to operate the HDC on a bit-level clock (e.g., synchronized to the RWC clock). However, this increases system complexity as logic related to the HDC will be run at a high frequency.

SUMMARY

Described herein are systems, devices, and methods for performing bit-locked operations on media. A first control signal is received from a first source, and a second control signal is generated at a second source in response to receiving the first control signal. Media is accessed according to the second control signal, and one or more synchronization markers are located during the accessing of the media. Bit-level synchronization is achieved between the second source and the media based, at least in part, on the one or more synchronization markers. A control operation is performed on the media, where the control operation is performed with bit-level synchrony between the second source and the media.

In certain implementations of the above described systems, devices, and methods, a verification signal is transmitted from the second source to the first source to indicate that bit-level synchrony has been achieved. In certain implementations of the above described systems, devices, and methods, a verification signal is transmitted from the second source to the first source to indicate that the one or more synchronization markers have been located.

Also described herein are systems, devices, and methods related to a controller for performing bit-locked operations on media. The controller includes interface circuitry capable of receiving a first control signal, signal generation circuitry capable of generating a second control signal in response to receiving the first control signal, and controller circuitry capable of accessing the media according to the second control signal, locating one or more synchronization markers during the accessing of the media, achieving bit-level synchronization with the media based, at least in part, on the one or more synchronization markers, and performing a control operation on the media.

In certain implementations of the controller, the first control signal is generated by a hard disk controller and/or the second control signal is generated by a read/write channel. In certain implementations of the controller, the interface circuitry, the signal generation circuitry, and the control circuitry are located on a single controller device. In certain implementations of the controller, the control operation is a preamble write operation.

In certain implementations of the controller, the one or more synchronization markers are located in a respective one or more servo information wedges of the media. In certain implementations of the controller, the first control signal and the second control signal each have a square pulse wave shape. In certain implementations of the controller, pulse widths of the second control signal are narrower than pulse widths of the first control signal.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

It may be advantageous to provide an interface between a RWC and a HDC that allows bit-level synchronization with media without high complexity. For example, it may be advantageous to design an interface in which the RWC generates read, write, and servo gating signals using information received from the HDC. The RWC may be capable of generating synchronous gate signals, as the RWC may lock to the media during demodulation of servo wedges on the media. If a phase offset along a track direction between a servo address mark and a first bit island of a sector being written to media can be calibrated during drive manufacturing and provided to the RWC, the RWC can generate a write gating signal in bit-level synchrony with the media. In an arrangement, the HDC initiates requests related to gating signals and provides these request to the RWC.

Figure 1:
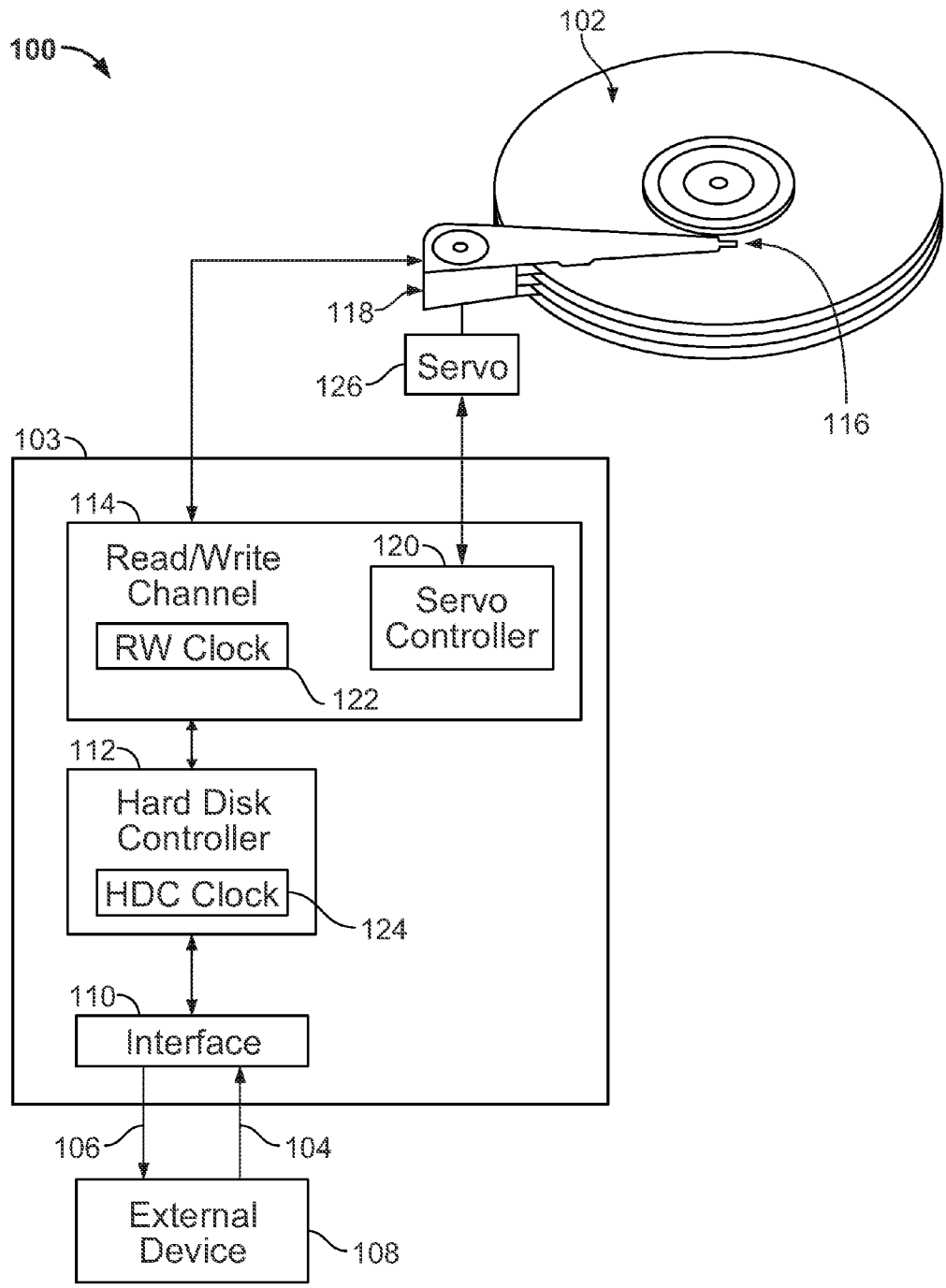
FIG. 1 shows an illustrative hard disk control system in accordance with an embodiment of the present disclosure.

FIG. 1 shows an illustrative hard disk control system in accordance with an embodiment of the present disclosure. Hard disk control system 100 includes hard disk 102 and control interface 103. Control interface 103 receives data from external device 108 via input 104 and provides data to external device 108 via output 106. External device 108 may correspond to any suitable device that uses and/or stores data. For example, external device 108 may correspond to a computer motherboard, an audio device, a cellular phone, or a portable media storage device.

Interface 110 passes commands to and from HDC 112. HDC 112 generates intended control signals (also referred to as intended gating signals) describing desired data operations to and from hard disk 102. In particular, these instructions are generated at the approximate times that the desired data operations are to occur. For example, HDC 112 may issue intended read, intended write, and intended servo control signals to RWC 114 in order to initiate read, write, and servo operations, respectively.

The execution of RWC 114 is governed by RW clock 122, while the execution of HDC 112 is governed by HDC clock 124. RW clock 122 and HDC clock 124 generally operate asynchronously with respect to each other and also generally operate with different levels of resolution. In an arrangement, HDC clock 124 is used on RWC 114, and may be obtained as a down-sampled version of RW clock 122. RW clock 122 may itself be derived from a crystal source and further programmed by a user to a desired or an approximation of a desired frequency. The resolution of RW clock 122 is typically greater than that of HDC clock 124. For example, RW clock 122 may operate on a bit or sub-bit level of timing, while HDC clock 124 may operate at a symbol-level of timing. In an arrangement, RW clock 122 operates with a frequency that is some integer multiple of a bit-level frequency of the frequency of HDC clock 124 (e.g., RW clock 122 may operate with a frequency that is 8× or 12× the frequency of HDC clock 124).

In response to receiving intended control signals from HDC 112, RWC 114 generates internal control signals (also referred to as internal gating signals) at precise times at which commands (e.g., read, write, and servo commands) are to be implemented on media (e.g., hard disk 102). In an arrangement, RWC 114 determines these initiation times by utilizing information passed to RWC 114 from HDC 112 and servo address mark locations (represented, e.g., by a SAM_FOUND signal) obtained from servo wedge demodulation. RWC 114 transmits management signals to HDC 112 to inform HDC 112 of the times at which control operations on media (e.g., hard disk 102) begin.

HDC 112 receives the approximate location of a write head (i.e., within the sectors of hard disk 102) from servo controller 120. Servo controller 120 may be included inside RWC 114 and may provide information related to a track ID and/or a position error signal (PES) to HDC 112. Servo 126 positions read/write heads 116, for example, via arm 118, in a desired location.

Figure 2:
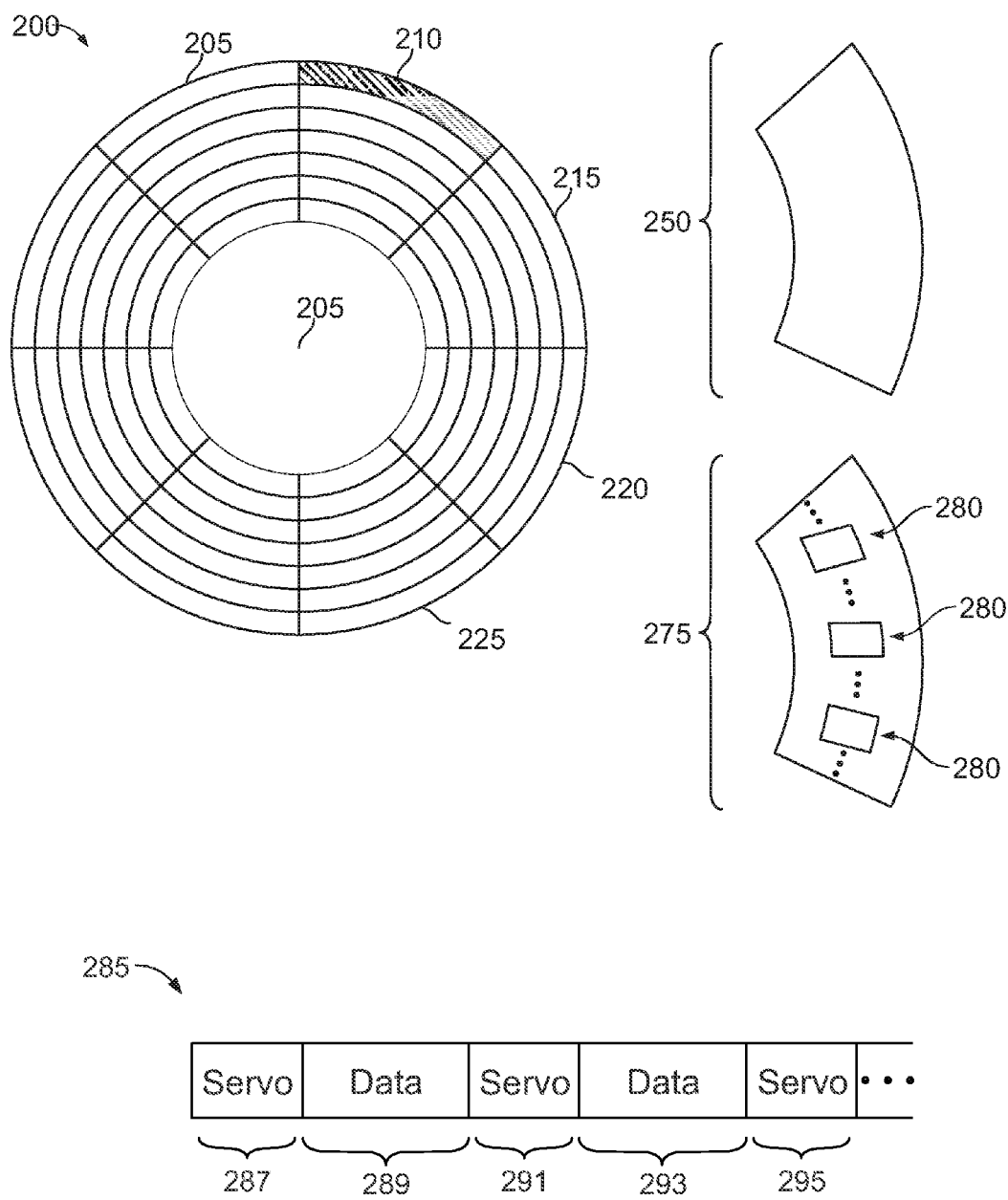
FIG. 2 shows illustrative formats of continuous and discrete media in accordance with an embodiment of the present disclosure.

FIG. 2 shows illustrative formats of continuous and discrete media in accordance with an embodiment of the present disclosure. Media 200 may correspond to a single magnetic disk (i.e., platter) that is part of hard disk 102 (FIG. 1). Area 205 of media 200 is unused for data storage and retrieval. Media 200 is (logically) divided into a series of concentric rings, referred to as tracks, and each track includes multiple data wedges and servo wedges. FIG. 2 is meant to be illustrative only. In practice, there are typically many more tracks on media, and many more wedges per track (both servo and data wedges), than depicted in FIG. 2. Further, the unused portion of media in practice may either be larger or smaller than the relative size of area 205 to the area of media 200. For example, in an arrangement, the width of a track is on the order of 5-10 microns, and the length of a sector is on the order of 500-1000 microns.

Wedge illustration 250 depicts a magnetic structure of a wedge area when media 200 corresponds to continuous media. In this case, the area depicted in wedge illustration 250 is an approximately magnetically uniform. area. A wedge according to wedge illustration 250 may be created using, e.g., magnetic grains or a continuous magnetic medium.

Wedge illustration 275 depicts a magnetic structure of a sector when media 200 corresponds to discrete (or "printed") media. Wedge illustration 275 depicts a structure that that may be used by a system, e.g., hard disk control system 100 (FIG. 1), to perform BPR. As shown in FIG. 2, wedge illustration 275 includes discrete magnetic regions, referred to as magnetic islands 280, with other non-magnetic material between the islands.

Discrete media may be advantageous compared to continuous media in increasing the data density available in a given media format and/or reducing noise and other artifacts associated with the storage and retrieval of data. Discrete media typically requires careful synchronization of a writing mechanism, e.g., a write head from read/write heads 116 (FIG. 1) and the bit-level magnetic islands in media, e.g., magnetic islands 280 of media 200, in order to properly write to the media.

As depicted in FIG. 2, media 200 is partitioned into data and servo wedges (referred to also as "wedge servo" form), and servo information is recorded in alternating wedges of media 200. In practice, the width of a servo wedge, e.g., servo wedge 205 or 215, is smaller than the width of a data wedge, e.g., data wedge 210. Data wedges are further subdivided into sectors, while servo wedges typically contain servo payload.

Track format 285 illustrates a format of a track of data from media 200 according to an arrangement. Track format 285 shows alternating sections of servo information, i.e., servo information 287, 291, and 295 and data information, i.e., data information 289 and 293. Servo information 287, 291, and 295 may correspond to servo information from a single track of data from servo wedges 305, 315, and 325, respectively. Similarly, data information 289 and 293 may correspond to data information from the single track of data and from data wedges 310 and 320, respectively.

It should be obvious to one of ordinary skill in the art, based on the disclosure and teachings provided herein, that the "servo wedge" logical partitioning of media 200 is only one possible partition for which the disclosed techniques are applicable.

Figure 3:
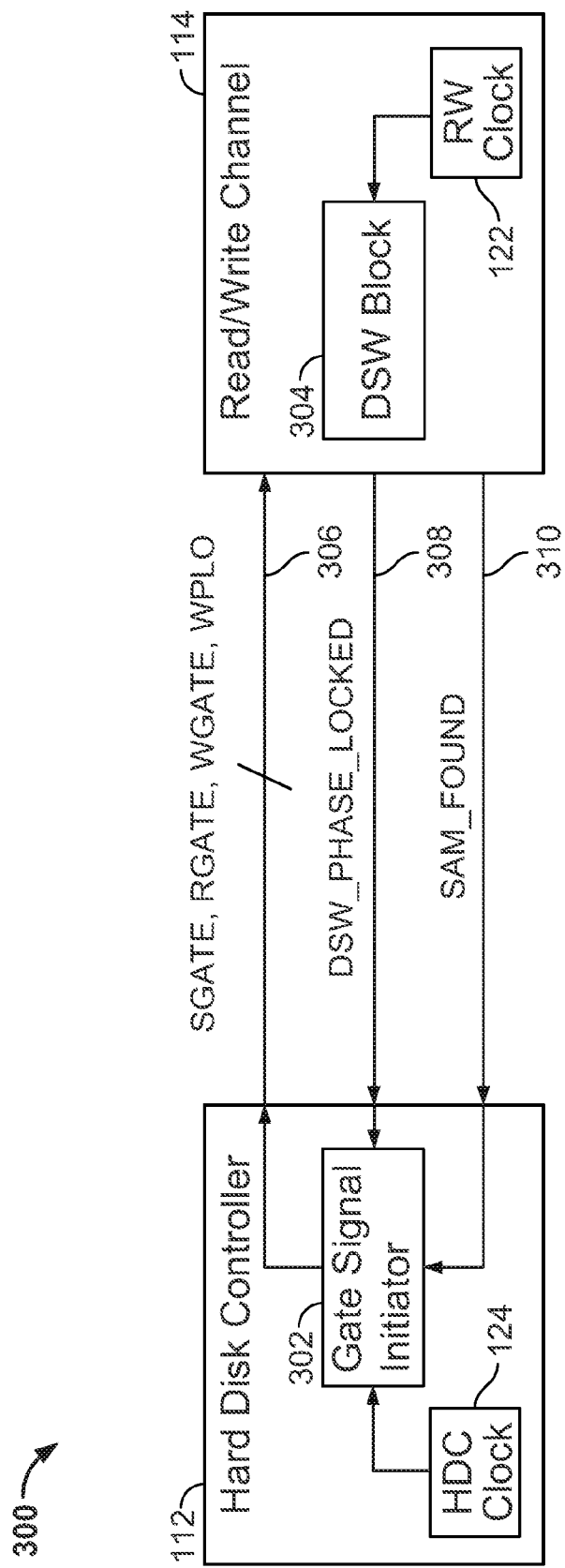
FIG. 3 shows a HDC/RWC interface in accordance with an embodiment of the present disclosure.

FIG. 3 shows HDC/RWC interface 300 in accordance with an embodiment of the present disclosure. HDC/RWC interface 300 may correspond to a more detailed illustration of a portion of control interface 103 (FIG. 1). Both HDC 112 (FIGS. 1 and 3) and RWC 114 (FIGS. 1 and 3) typically are situated on the same chip and share common circuitry. However, as would be obvious to one of ordinary skill in the art based on the disclosure and teachings provided herein, HDC 112 (FIGS. 1 and 3) and RWC 114 (FIGS. 1 and 3) could be situated on different chips and/or employ different circuits in their implementation.

HDC 112 (FIGS. 1 and 3) operates according to HDC clock 124 (FIGS. 1 and 3) and includes gate signal initiator 302. Gate signal initiator 302 signals an intent to perform a control operation (e.g., a data read, data write, or servo read operation). In particular, gate signal initiator 302 generators an indicator signal (e.g., a pulse signal) corresponding to a given control operation. RWC 114 (FIGS. 1 and 3) generates the an actual gating signal based on its high precision internal clock in response to an output indicator signal from gate signal initiator 302. In an arrangement, gate signal initiator 302 generates each of the following intended control signals:

SGATE (HDC)—indicates HDC's intent to read servo information from media;

RGATE (HDC)—indicates HDC's intent to read data information from media; and

WGATE (HDC)—indicates HDC's intent to write data information to media; and

As RWC 114 (FIGS. 1 and 3) generates actual gating signals, some or all of these intended control signals issued by HDC 112 (FIGS. 1 and 3) may he in the form of a pulse signal rather than an actual gating signal. The intended control signals are transmitted to RWC 114 (FIGS. 1 and 3) using lines 306. Lines 306 is merely a logical representation and may not represent the actual physical structure used to transmit information between HDC 112 (FIGS. 1 and 3) and RWC 114 (FIGS. 1 and 3).

In addition to the intended control signal described above, HDC 112 (FIGS. 1 and 3) may generate a signal that informs RWC 114 (FIGS. 1 and 3) of how many bits of preamble should be written to media and when to start writing the preamble to the media (this information may correspond to information generated in a WPLO-type signal). RWC 114 (FIGS. 1 and 3) includes Disk Synchronous Write (DSW) block 304 and operates according to RW clock 122 (FIGS. 1 and 3).

RWC 114 (FIGS. 1 and 3) receives an intended control signal from HDC 112 (FIGS. 1 and 3), and may receive two additional control signals from HDC 112 (FIGS. 1 and 3). In particular, RWC 114 (FIGS. 1 and 3) may receive GATE_START and GATE_PHASE signals from HDC 112 (FIGS. 1 and 3). The GATE_START signal received by RWC 114 (FIGS. 1 and 3) may indicate a WGATE_INT assertion location relative to a found servo location, and the GATE_PHASE signal received by RWC 114 (FIGS. 1 and 3) may indicate a re-phase (or phase adjustment) based on the found servo location. Based on receiving the intended control signal, GATE_START, and GATE_PHASE from HDC 112 (FIGS. 1 and 3), RWC 114 generates a corresponding internal control signal that is used by HDC/RWC interface 300 to achieve bit-level synchronization with media.

In an arrangement, internal control signals are a replica of the intended control signal with an appropriate time offset (i.e., time delay). RWC 114 (FIGS. 1 and 3) is capable of generating each of the following internal control signals:

SGATE_INT (RWC)—a gating signal that is bit-locked to media and that corresponds to reading servo information from the media;

RGATE_INT (RWC)—a gating signal that is bit-locked to media and that corresponds to reading data information from the media;

WGATE_INT (RWC)—a gating signal that is bit-locked to media and that corresponds to writing servo information from the media; and WPLO_INT (RWC)—a gating signal that is bit-locked to media and that corresponds to writing preamble information to the media.

In normal operation, an intended control signal is passed from HDC 112 (FIGS. 1 and 3) to RWC 114 (FIGS. 1 and 3) in advance of the actual time that the corresponding operation (e.g., a read or write operation) is to be performed on media. This is to allow sufficient time for RWC to receive the intended control signal and generate a corresponding internal control signal. For example, in an arrangement, HDC 112 (FIGS. 1 and 3) sends an intended control signal to RWC 114 (FIGS. 1 and 3) early by a length of time that corresponds to at least 200 transmission bits, where the number 200 is used as an example.

RWC 114 (FIGS. 1 and 3) reads synchronization markers from media (e.g., servo address markers (SAM)). When a synchronization marker is found, a value of SAM_FOUND is found accordingly. After one or more synchronization markers are found, HDC/RWC interface 300 will eventually achieve bit-level synchronization with media. Once HDC/RWC interface 300 has achieved bit-level synchronization with media it updates the value of DSW_PHASE_LOCKED to logical value 1, and transmits this information to HDC 112 (FIGS. 1 and 3) on line 308. If, on the other hand, RWC 114 (FIGS. 1 and 3) is not bit-locked (e.g., if RWC 114 (FIGS. 1 and 3) loses bit-level synchronization), then DSW_PHASE_LOCKED is set to logical value 0, and this information is transmitted to HDC 112 (FIGS. 1 and 3). Writing operations, i.e., corresponding to WPLO and WGATE, only commence once bit-level synchronization is achieved and when DSW_PHASE_LOCKED is assigned the logical value 1. Reading operations, e.g., corresponding to RGATE and SGATE, may be commenced even when DSW_PHASE_LOCKED is assigned to the value of 0, if a preamble length is sufficiently large. When DSW_PHASE_LOCKED is equal to 0, RWC 114 (FIGS. 1 and 3) is unable to generate internal gates that are synchronous with media, therefore RWC 114 (FIGS. 1 and 3) relies on external gate signals provided by HDC 112 (FIGS. 1 and 3) before phase synchronization with the media has been achieved. In particular, as been seen in FIG. 4, SGATE 410 and SGATE_INT 430 are identical during an initial start-up period.

Figure 4:
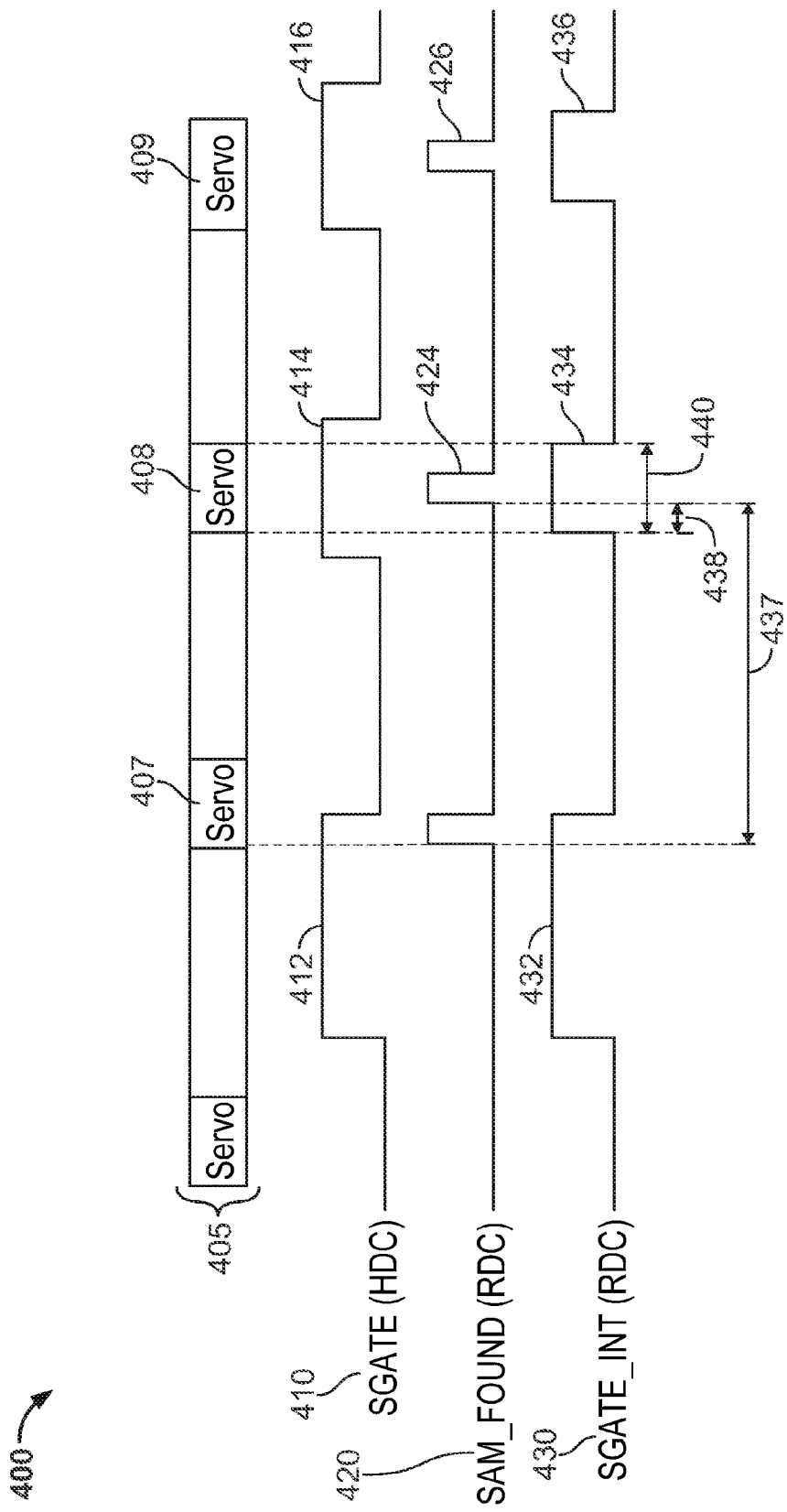
FIG. 4 shows a process for generating a servo gating signal at a RWC in accordance with an embodiment.

FIG. 4 shows a process for generating a servo gating signal at RWC 114 (FIGS. 1 and 3) in accordance with an embodiment. Timing diagram 400 depicts a portion of a track 405, which alternates between servo and non-servo regions, and corresponding timing signals generated at HDC 112 (FIGS. 1 and 3) and RWC 114 (FIGS. 1 and 3). During a start-up phase (for example, during an initialization of HDC/RWC interface 300 or a recalibration of HDC/RWC interface 300), HDC 112 (FIGS. 1 and 3) asserts an intended gating control signal, SGATE 410, as depicted in FIG. 4. SGATE 410 is asserted to allow HDC 112 (FIGS. 1 and 3) to determine a current head location. The assertion of SGATE 410 results in RWC 114

(FIGS. 1 and 3) searching for a servo synchronization marker. HDC 112 (FIGS. 1 and 3) initially asserts SGATE 410 until a first servo synchronization marker is found. In particular, RWC 114 (FIGS. 1 and 3) will locate a first servo synchronization marker, for example, within servo region 407 and will correspondingly assert SAM_FOUND 420 during the period over which the servo synchronization marker is found. As shown in FIG. 4, RWC 114 (FIGS. 1 and 3) will continue to assert SAM_FOUND 420 (e.g., assertions 424 and 426) at the locations of servo synchronization markers in subsequent servo regions 408 and 409, respectively. So that RWC 114 (FIGS. 1 and 3) can make subsequent assertions of SAM_FOUND 420, HDC 112 (FIGS. 1 and 3) may pass a length parameter describing the length between servo synchronization markers (e.g., specified in terms of a number of clock cycles). This length is represented in FIG. 4 by length 437.

As shown in FIG. 4, the corresponding internal servo control signal at HDC 112 (FIGS. 1 and 3), i.e., SGATE_INT 460 will initially mimic SGATE 410, as RWC 114 (FIGS. 1 and 3) is not able to provide more accurate timing location for servo regions of track 405 at this stage. However, SGATE 410 will have subsequent assertions, for example, assertions 414 and 416. Despite RWC 114 (FIGS. 1 and 3) having locked onto servo synchronization markers within regions 408 and 409, HDC 112 (FIGS. 1 and 3) still has coarse knowledge of the locations of the locations of these servo regions. In particular implementations, this is evidenced by assertion regions 414 and 416 having a width that exceeds the corresponding widths of servo regions 408 and 409, respectively.

To obtain a more accurate knowledge of the locations of servo regions 408 and 409, HDC 112 (FIGS. 1 and 3) may pass certain parameters to RWC 114 (FIGS. 1 and 3), so that RWC 114 (FIGS. 1 and 3) can use its more accurate clock to determine locations of servo regions 408 and 409 with increased precision. In particular, RWC 114 (FIGS. 1 and 3) internally generates SAM_FOUND 420 with high precision during times that a servo synchronization marker is found. Thus, HDC 112 (FIGS. 1 and 3) need only pass information to allow RWC 114 (FIGS. 1 and 3) to generate a full assertion over the entire servo information from SAM_FOUND 420.

For example, HDC 112 (FIGS. 1 and 3) may pass length 438 to RWC 114 (FIGS. 1 and 3), which represents a length between the start of an servo synchronization assertion (e.g., assertion 424) and the start of a corresponding servo region (e.g., servo region 408). Further, HDC 112 (FIGS. 1 and 3) may pass length 440 to RWC 114 (FIGS. 1 and 3), which represents a length of an entire servo region. From these parameters, RWC 114 (FIGS. 1 and 3) is capable of generating SGATE 410 precisely to the locations of servo regions 408 and 409. For example, as depicted in FIG. 4, assertions 434 and 436 of RWC 114 (FIGS. 1 and 3) closely coincide with the actual locations of servo regions 408 and 409, respectively.

It should be understood that the particular parameters and techniques described above are exemplary, and similar types of information (e.g., similar parameters) may be passed from HDC 112 (FIGS. 1 and 3) to RWC 114 (FIGS. 1 and 3) to allow RWC 114 (FIGS. 1 and 3) to generate an accurate gating signal synchronized to servo locations on media.

Figure 5:
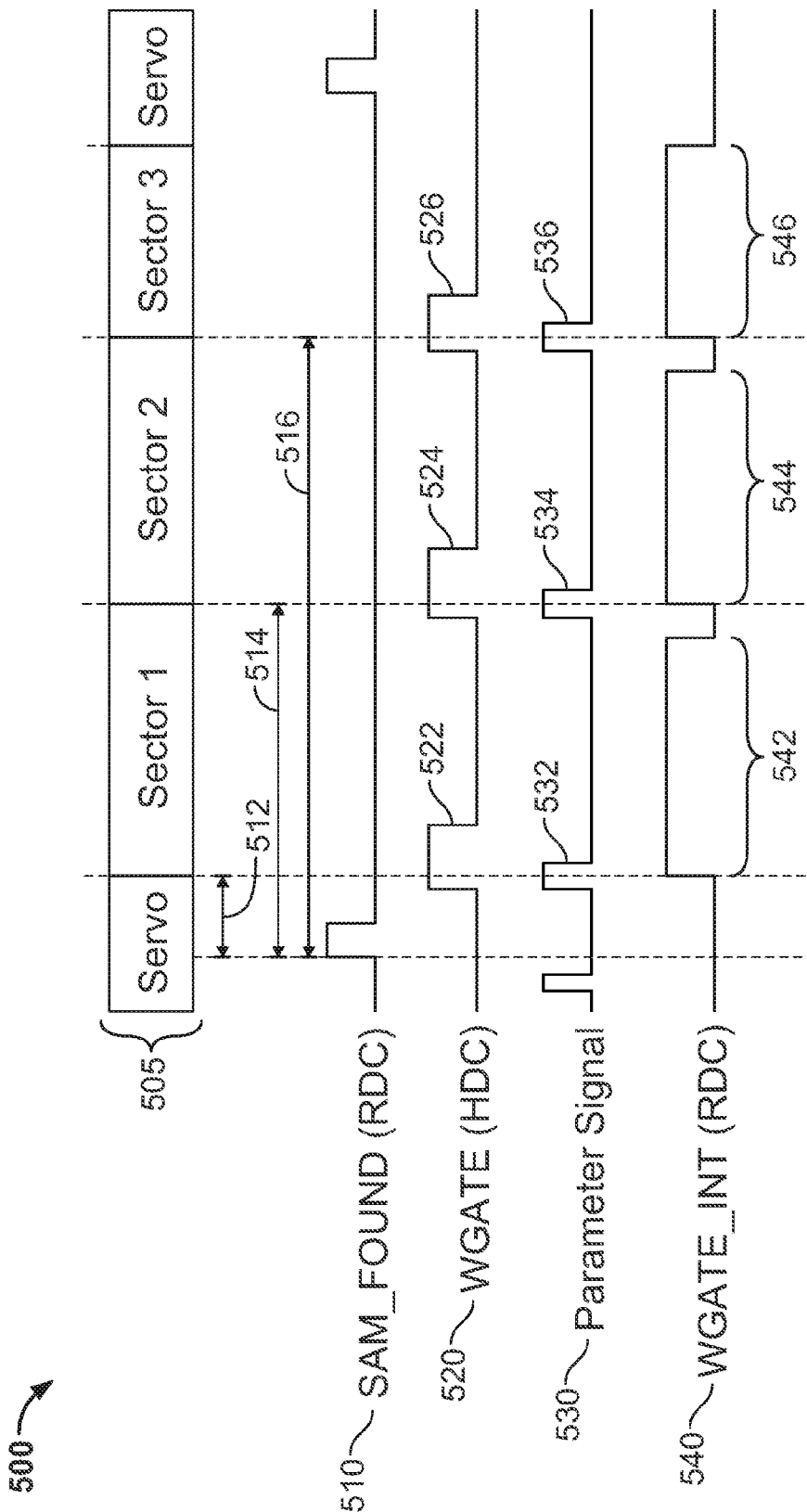
FIG. 5 shows a process for generating a write gating signal at a RWC in accordance with an embodiment.

FIG. 5 shows a process for generating a write gating signal at RWC 114 (FIGS. 1 and 3) in accordance with an embodiment. RWC 114 (FIGS. 1 and 3) initially generates SAM_FOUND 510. SAM_FOUND 510 may be generated corresponding track 505 using the techniques described in relation to SAM_FOUND 420 (FIG. 4) for track 404 (FIG. 4). HDC 112 (FIGS. 1 and 3) asserts an intended write gating signal, WGATE 520, at times at which HDC 112 (FIGS. 1 and 3) intends to initiate a write to media. Further, each time WGATE 520 is asserted, HDC 112 (FIGS. 1 and 3) also transmits parameter signal 530, which either sends, or instructs RWC 114 (FIGS. 1 and 3) to retrieve, parameters needed for RWC 114 (FIGS. 1 and 3) to perform a write operation. These parameters may include an offset parameter and a symbol count parameter.

The offset parameter provides RWC 114 (FIGS. 1 and 3) with a length (e.g., specified in terms of a number of clock cycles) from a most recent assertion of SAM_FOUND 510 at which the write operation is to begin, while the symbol count parameter provides RWC 114 (FIGS. 1 and 3) with a number of symbols to write during the write operation. The offset parameter may include both a symbol count value and a phase value, or may include just a symbol count value. For example, as illustrated in FIG. 5, HDC 112 (FIGS. 1 and 3) makes assertion 522 of WGATE 520 to initiate a write operation, and also makes a corresponding assertion 532 of parameter signal 530, which allows RWC 114 (FIGS. 1 and 3) to obtain an offset parameter describing length 512, the length from the location of the most recent assertion of SAM_FOUND 510 to the location where write operation is to begin, and a symbol count parameter describing length 542, the length for which RWC 114 (FIGS. 1 and 3) should assert an internal write gating signal, WGATE_INT 540.

Similarly, as illustrated in FIG. 5, HDC 112 (FIGS. 1 and 3) makes assertion 524 and 526 of WGATE 520 to initiate additional write operations, and also makes a corresponding assertions 534 and 536 of parameter signal 530, which allows RWC 114 (FIGS. 1 and 3) to obtain offset parameters 514 and 516 and symbol count parameters 544 and 526, respectively.

Figure 6:
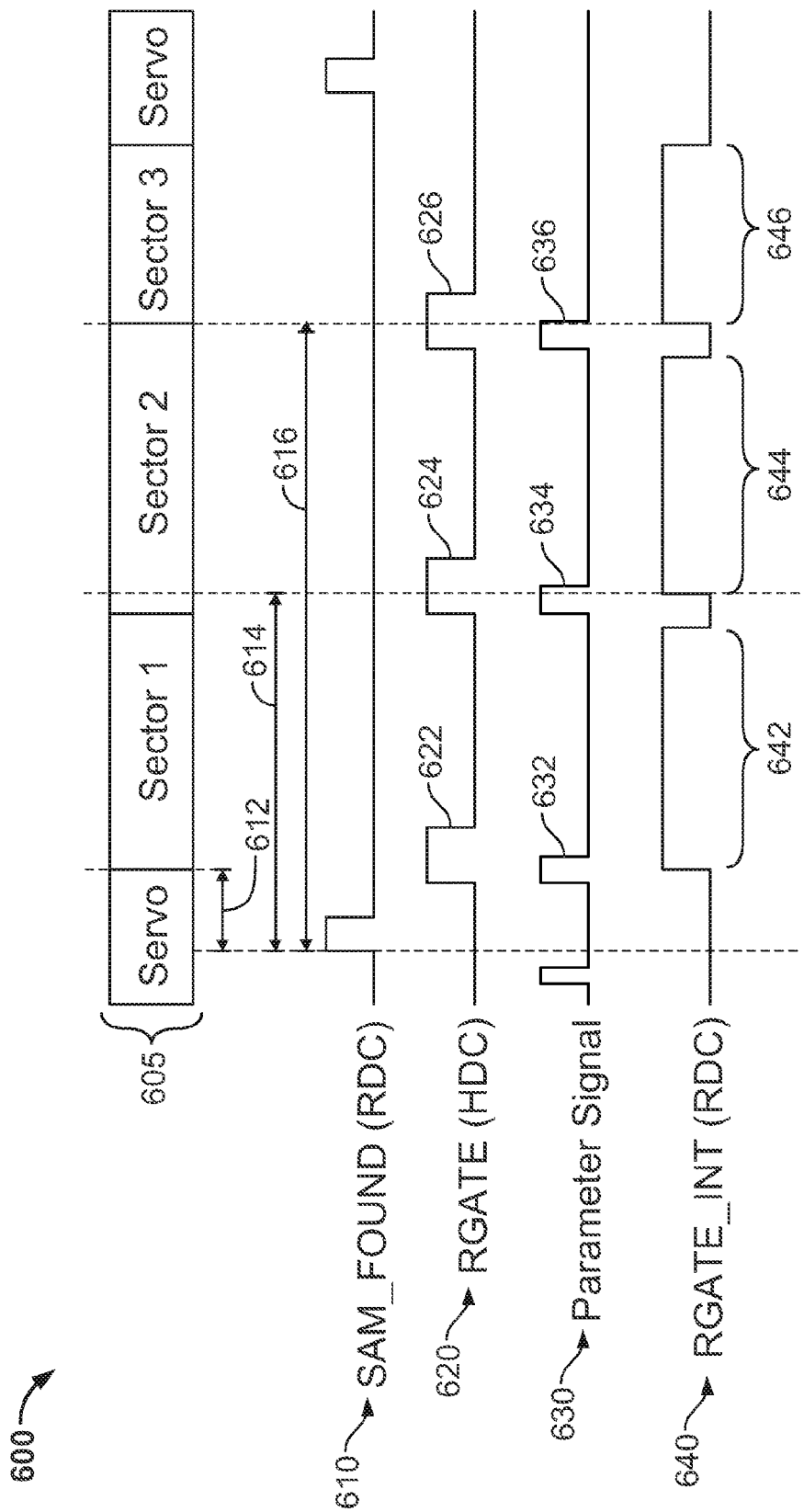
FIG. 6 shows a process for generating a read gating signal at a RWC in accordance with an embodiment.

FIG. 6 shows a process for generating a read gating signal at RWC 114 (FIGS. 1 and 3) in accordance with an embodiment. RWC 114 (FIGS. 1 and 3) initially generates SAM_FOUND 610. SAM_FOUND 610 may be generated corresponding track 605 using the techniques described in relation to SAM_FOUND 420 (FIG. 4) for track 404 (FIG. 4). HDC 112 (FIGS. 1 and 3) asserts an intended write read signal, RGATE 620, at times at which HDC 112 (FIGS. 1 and 3) intends to initiate a read from media. Further, each time RGATE 620 is asserted, HDC 112 (FIGS. 1 and 3) also transmits parameter signal 630, which either sends, or instructs RWC 114 (FIGS. 1 and 3) to retrieve, parameters needed for RWC 114 (FIGS. 1 and 3) to perform a read operation. These parameters may include a read offset parameter and a read symbol count parameter that serve similar functions to those of the write-based offset parameter and symbol count parameter described in relation to FIG. 5. In particular, the read offset parameter provides RWC 114 (FIGS. 1 and 3) with a length (e.g., specified in terms of a number of clock cycles) from a most recent assertion of SAM_FOUND 610 at which the read operation is to begin, while the read symbol count parameter provides RWC 114 (FIGS. 1 and 3) with a number of symbols to read during the read operation. The read offset parameter may include both a symbol count value and a phase value, or may include just a symbol count value. For example, as illustrated in FIG. 6, HDC 112 (FIGS. 1 and 3) makes assertion 622 of RGATE 620 to initiate a read operation, and also makes a corresponding assertion 632 of parameter signal 630, which allows RWC 114 (FIGS. 1 and 3) to obtain a read offset parameter describing length 642, the length from the location of the most recent assertion of SAM_FOUND 610 to the location where the read operation is to begin, and the read symbol count parameter describing length 642, the length for which RWC 114 (FIGS. 1 and 3) should assert an internal read gating signal, RGATE_INT 640.

Similarly, as illustrated in FIG. 6, HDC 112 (FIGS. 1 and 3) makes assertion 624 and 626 of RGATE 620 to initiate additional read operations, and also makes a corresponding assertions 634 and 636 of parameter signal 630, which allows RWC 114 (FIGS. 1 and 3) to obtain read offset parameters 614 and 616 and symbol count parameters corresponding to symbol count parameters 644 and 646, respectively.

Figure 7:
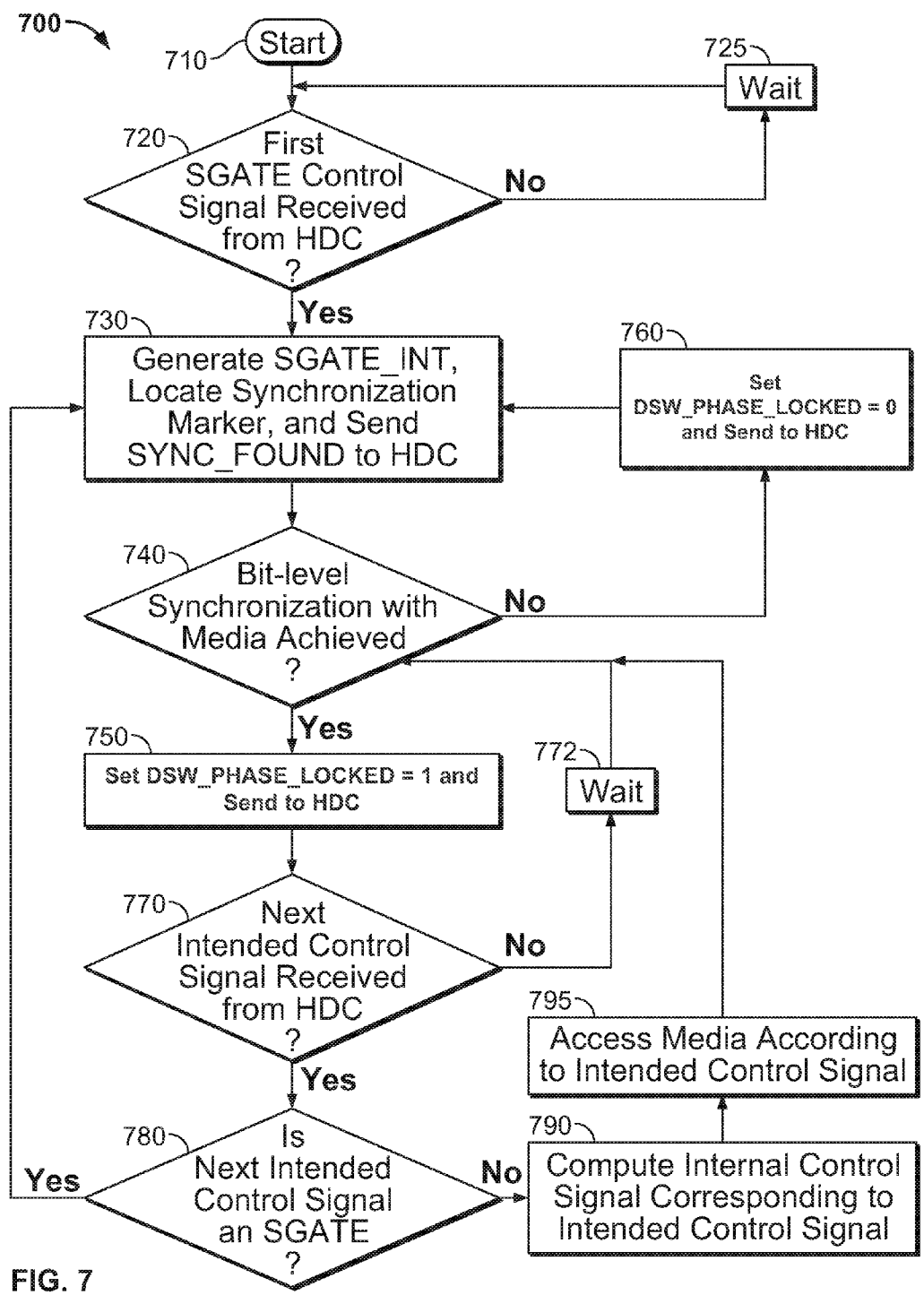
FIG. 7 shows an illustrative example of an execution process used by a RWC interface to perform one or more control operations in accordance with an embodiment.

FIG. 7 shows an illustrative example of an execution process used by HDC/RWC interface 300 (FIG. 3) to perform one or more control operations in accordance with an embodiment. At 710, process 700 starts. For example, process 700 may start in response to a new read or write request from external device 108 (FIG. 1). At 720, process 700 determines if a first SGATE signal has been received from HDC 112 (FIGS. 1 and 3) since process 700 started. If a first SGATE signal (e.g., SGATE 410 (FIG. 4)) has been received, then process 700 proceeds to 730. If, on the other hand, a first SGATE signal has not yet been received from HDC 112 (FIGS. 1 and 3), then process 700 proceeds to 725, where it waits for a length of time before returning to 720.

At 730, process 700 locates a servo synchronization marker. In particular, RWC 114 (FIGS. 1 and 3) first generates signal SGATE_INT (e.g., SGATE_INT 430 (FIG. 4)) and reads the next servo synchronization marker from media (e.g., hard disk 102 (FIG. 1)). Process 700 generates a SAM_FOUND signal accordingly (e.g., SAM_FOUND 420 (FIG. 4)) and transmits SAM_FOUND to HDC 112 (FIGS. 1 and 3) via line 310 (FIG. 3). Process 700 then proceeds to 740.

At 740, process 700 determines if HDC/RWC interface 300 (FIG. 3) has achieved bit-level synchronization with media (e.g., hard disk 102 (FIG. 1)). If bit-level synchronization has been achieved, process 700 proceeds to 750. If bit-level synchronization has not been achieved, process 700 proceeds to 760. At 760, process 700 sets the value of signal DSW_PHASE_LOCKED equal to 0, and returns to 730. At 750, process 700 sets the value of signal DSW_PHASE_LOCKED equal to 1 and proceeds to 770.

At 770, process 700 determines if a next intended control signal has been received from HDC 112 (FIGS. 1 and 3). If not, process 700 waits for a fixed length of time at 772 and then returns to 740. If, on the other hand, a next intended control signal has been received from HDC 112 (FIGS. 1 and 3), process 700 proceeds to 780. At 780, process 700 determines if the next intended control signal (i.e., determined at 770) is an SGATE signal. If so, process 700 returns to 730. Otherwise, process 700 continues to 790.

At 790, process 700 computes an internal control signal corresponding to the intended control signal determined at 770. For example, if a WGATE signal is determined at 770, a corresponding WGATE_INT signal is computed at 790. Process 700 then proceeds to 795, where media is accessed according to the internal control signal generated at 790. For example, if the internal control generated at 790 is a WGATE_INT signal, then a corresponding write operation to media is performed at 795. Process 700 then returns to 740 to determine if bit-level synchronization is (still) achieved.

Servo synchronization markers have an advantageous property of (typically) being written onto media (e.g., hard disk 102) permanently upon manufacturing. However, it should be obvious to one of ordinary skill in the art, based on the disclosure and teachings provided herein, that servo synchronization markers are one suitable type of marker that may be used to RWC 114 (FIGS. 1 and 3) to achieve synchronization, and that other suitable types of markers may also be used by process 700.

It should be obvious to one of ordinary skill in the art, based on the disclosure and teachings provided herein, that the process 700 is merely one suitable way to implement a portion of HDC/RWC interface 300 (FIG. 3), that many modifications and permutations to process 700 may be made without departing from the spirit and scope of the disclosure. For example, the wait times at 725 and/or 772 may be omitted or designed to vary with respect to, e.g., operating conditions within HDC/RWC interface 300 (FIG. 3). Similarly, servo synchronization markers and/or achievement of phase lock could be determined either more or less frequently than that indicated by process 700. Further, RWC 114 (FIGS. 1 and 3) may include or omit elements not described in process 700.

The above described arrangements and embodiments are presented for the purposes of illustration and not of limitation. One or more parts of techniques described above may be performed in a different order (or concurrently) and still achieve desirable results. In addition, techniques of the disclosure may be implemented in hardware, such as on an application specific integrated circuit (ASIC) or on a field-programmable gate array (FPGA). The techniques of the disclosure may also be implemented in software.

What is claimed is:

1. A method for performing bit-locked operations on media, the method comprising:
   receiving a first control signal from a first source;
   generating a second control signal at a second source in response to receiving the first control signal;
   accessing the media according to the second control signal;
   locating a plurality of synchronization markers during the accessing of the media;
   achieving bit-level synchronization between the second source and the media after the plurality of synchronization markers is located; and
   performing a control operation on the media in response to verifying that bit-level synchronization is achieved, wherein the control operation is performed with bit-level synchrony between the second source and the media.

2. The method of claim 1, wherein the first control signal is selected from the group consisting of a servo read signal and a servo write signal.

3. The method of claim 1, wherein:
   the first control signal is an intended control signal; and
   the second control signal is an internal control signal.

4. The method of claim 1, wherein the second control signal is a delayed version of the first control signal.

5. The method of claim 1, wherein the control operation is a preamble write operation.

6. The method of claim 1, further comprising transmitting a verification signal from the second source to the first source to indicate that bit-level synchrony has been achieved.

7. The method of claim 1, further comprising transmitting a verification signal from the second source to the first source to indicate that a synchronization marker from the one or more synchronization markers has been located.

8. The method of claim 1, wherein the one or more synchronization markers are located in a respective one or more servo information wedges of the media.

9. The method of claim 1, wherein the first control signal and the second control signal each have a square pulse wave shape.

10. The method of claim 9, wherein pulse widths of the second control signal are narrower than pulse widths of the first control signal.

11. A controller system for performing bit-locked operations on media, the controller system comprising:
   interface circuitry configured to receive a first control signal;

signal generation circuitry configured to generate a second control signal in response to receiving the first control signal; and controller circuitry configured to:
- access the media according to the second control signal;
- locate a plurality of synchronization markers during the accessing of the media;
- achieve bit-level synchronization with the media after the plurality of synchronization markers is located; and
- perform a control operation on the media in response to verifying that bit-level synchronization is achieved.

12. The controller system of claim 11, wherein the first control signal is generated by a hard disk controller.

13. The controller system of claim 11, wherein the second control signal is generated by a read/write channel.

14. The controller system of claim 11, wherein the interface circuitry, the signal generation circuitry, and the control circuitry are located on a single controller device.

15. The controller system of claim 11, wherein the control operation is a preamble write operation.

16. The controller system of claim 11, wherein the interface circuitry is further configured to transmit a verification signal from a read/write channel to a hard disk controller to indicate that bit-level synchrony has been achieved.

17. The controller system of claim 11, wherein the interface circuitry is further configured to transmit a verification signal from a read/write channel to a hard disk controller to indicate that a synchronization marker from the one or more synchronization markers has been located.

18. The controller system of claim 11, wherein the one or more synchronization markers are located in a respective one or more servo information wedges of the media.

19. The controller system of claim 11, wherein the first control signal and the second control signal each have a square pulse wave shape.

20. The controller system of claim 19, wherein pulse widths of the second control signal are narrower than pulse widths of the first control signal.

* * * * *